EXCESS VOLTAGE DISSIPATING DEVICE

Filed May 13, 1955

4 Sheets-Sheet 1

INVENTORS.
Edward Bauman
BY John O. G. Darrow,
Brown, Jackson, Boettcher & Dienner
Atty's Feb. 24, 1959 E. BAUMAN ET AL 2,875,366

EXCESS VOLTAGE DISSIPATING DEVICE

Filed May 13, 1955 4 Sheets-Sheet 2

INVENTORS.
Edward Bauman
BY John O. G. Darrow

Brown, Jackson, Boettcher & Dienner
Attys.

INVENTORS.
Edward Bauman
BY John O. G. Darrow,

Brown, Jackson, Boettcher & Dienner
Att'ys.

Feb. 24, 1959 E. BAUMAN ET AL 2,875,366

EXCESS VOLTAGE DISSIPATING DEVICE

Filed May 13, 1955

4 Sheets-Sheet 4

INVENTORS.
Edward Bauman
BY John O. G. Darrow,

Brown, Jackson, Boettcher & Dienner
Attys.

2,875,366

EXCESS VOLTAGE DISSIPATING DEVICE

Edward Bauman and John O. G. Darrow, Galion, Ohio, assignors to North Electric Company, a corporation of Ohio Application May 13, 1955, Serial No. 508,118

11 Claims. (Cl. 313—306)

The present invention relates to a protective arrangement for transmission lines, and more particularly, to a novel protective arrangement for dissipating excess voltages and currents appearing on such lines.

Transmission line networks for communication services are widely used to interconnect central office exchanges and connect such exchanges to the numerous subscribers served thereby. As is well known the voltages and currents applied to the conductors of these latter transmission lines are relatively low, and they themselves offer little danger to the property of either the telephone companies or the subscribers and to the persons of all who render or use the service. Another type of transmission line which normally involves voltages and currents of much lower values than those utilized in communication systems is an antenna for receiving radio-frequency signals from either radio or television broadcasting stations. In the normal situation the conductor dimensions and power carrying capabilities of the other components for each of these transmission systems is designed to safely carry the preassigned voltages and currents.

Additionally, transmission line networks for the distribution of electrical power are extensively used to interconnect power generating stations, distribution substations and the ultimate power consumers. In the case of such power distribution systems the transmission line conductors and other associated equipment, such as power transformers, distribution switchboards, and circuit breakers, are designed to safely carry the currents and voltages normally assigned thereto.

However, excessively high voltages and currents from "foreign" sources may unexpectedly be caused to flow over such transmission lines and endanger the property and lives of those providing or utilizing such services. The most familiar of such "foreign" voltage sources is lightning originating because of electrical storms during which excessively high voltages and currents may be induced in the transmission lines by the lightning discharges or may even arise as a result of direct lightning strikes on the lines themselves. Lightning, by generating excessive heat, may burn out apparatus or conductors and cause fires in adjacent property or, by excessive voltage, may break down the insulation of apparatus and conductors. The danger to persons using these transmission systems is only too apparent whenever proper precautionary measures are absent.

Another equally serious hazard constantly presented to telephone and low voltage power systems lies in the extremely high currents and voltages which are caused to flow through such systems as a result of high tension transmission lines from which such voltages and currents in excess of power carrying capacities may be induced, or in case of a direct contact between the high tension transmission lines and other transmission systems may be caused to flow directly. Although voltages and currents arising from this later extraneous source are usually lower than those caused by lightning, practically the same kinds of damage to either life or property are involved.

For illustrative purposes the problems inherent in telephone systems will be considered although, as it may be appreciated, identical problems are present in the other systems previously discussed. Strenuous efforts have been applied to solve this problem of excessive voltages by telephone companies and to minimize these dangers and hazards. Such efforts have been successful to some extent. For example, the most widely used protective device in telephone systems has been the open-space cut-out or air-gap arrester which normally comprises a pair of carbon blocks usually held apart by an intervening insulating separator which by being partially cut away provides an air-gap between the two carbon blocks. Such carbon block structure is disposed between each side of the transmission line and a grounded bus bar, and is maintained in position by resilient spring members in a well known manner. When the line wires become charged to a sufficiently high potential, the air-gap between the two carbon blocks breaks down and the charge passes harmlessly from each line to ground.

Under certain circumstances, a high potential may exist between the two wires of the transmission line, rather than between each line and ground. In this case the carbon block structures heretofore described must be supplemented by an additional device presenting an air gap between the lines themselves, if such a hazard is to be avoided. Moreover, in the case of a four terminal junction in a two wire transmission line, excessive voltages may exist between terminals on opposite sides of the four terminal junction. In this case there are ten points between which excessively high potentials may exist. As the number of conditions in which large potential differences exist between transmission lines increases, the provision of the requisite number of discharge paths to afford complete protection presents a more complex problem. If the conventional carbon block air gap structure is used in each discharge path, the number of such devices required increases to a point where the wiring and mounting thereof becomes a serious problem.

To illustrate the difficulty of providing adequate protection from excessive voltages, reference is made to the case of a four terminal junction in a two wire line. Under these circumstances, discharge paths must be provided between each of the four terminals and ground, and between each terminal and the three remaining terminals. A total, therefore, of ten discharge paths is required. Not only does the expense of using ten carbon block devices militate against the provision of insuring adequate protection, but serious problems arise in securing adequate space for mounting such a number of protective devices. In carrier telephone systems, a further difficulty even more serious than the cost factor and space problems arises in that the length of leads to protective devices must be carefully controlled in relation to the wave length of the used carrier frequencies to guard against shunting of carrier currents by induction into unintentional loops. With any spacial distribution of ten carbon block devices, the lengths of the leads required to interconnect the transmission terminals and the protector devices where a four terminal network such as a low pass filter or matching transformer is used, present a serious problem from the standpoint of cross induction of carrier currents.

It is, therefore, an object of the present invention to provide a new and novel protective arrangement which minimizes the hazards resulting from the appearance of high potentials on transmission lines and which obviates one or more of the aforementioned difficulties.

It is another object of the present invention to provide a novel protective arrangement for transmission lines which occupies a minimum amount of space while yet affording a maximum of protection against excessive voltages.

It is yet a further object of the present invention to provide a new and novel protective arrangement which is simple to manufacture, extremely flexible in use, and inexpensive in relation to the protection it affords.

It is another object of the present invention to provide a novel protective arrangement for use with telephone carrier systems which offers a maximum of protection against excessively high potentials without introducing disruptive induced currents in the leads interconnecting the telephone transmission lines and the protective devices.

In accordance with the present invention an excess voltage protector device comprises a plurality of metallic plates or segments in fixed spaced apart relationship such that each plate is separated from each of the other plates by a gap across which potentials in excess of a predetermined amount may be discharged, and an enclosing structure which is separated from each of the metallic plates by gaps of predetermined width. Suitable supporting means are employed to maintain the metallic plates in their proper relationship.

Other features and advantages of the present invention will become more apparent from the separate figures of the accompanying drawings in which like elements are designated by like numerals and in which:

Figure 1 is a perspective view of the protector device of the present invention;

Figures 2A–4B are plan and elevational views of components of the protector device of the present invention useful in explaining its manufacture;

Figure 5 is a perspective view illustrating one embodiment of the protector device in a commercial environment;

Figures 1, 2A, 2B, 3A, 3B, 4A, 4B, 5, 6:
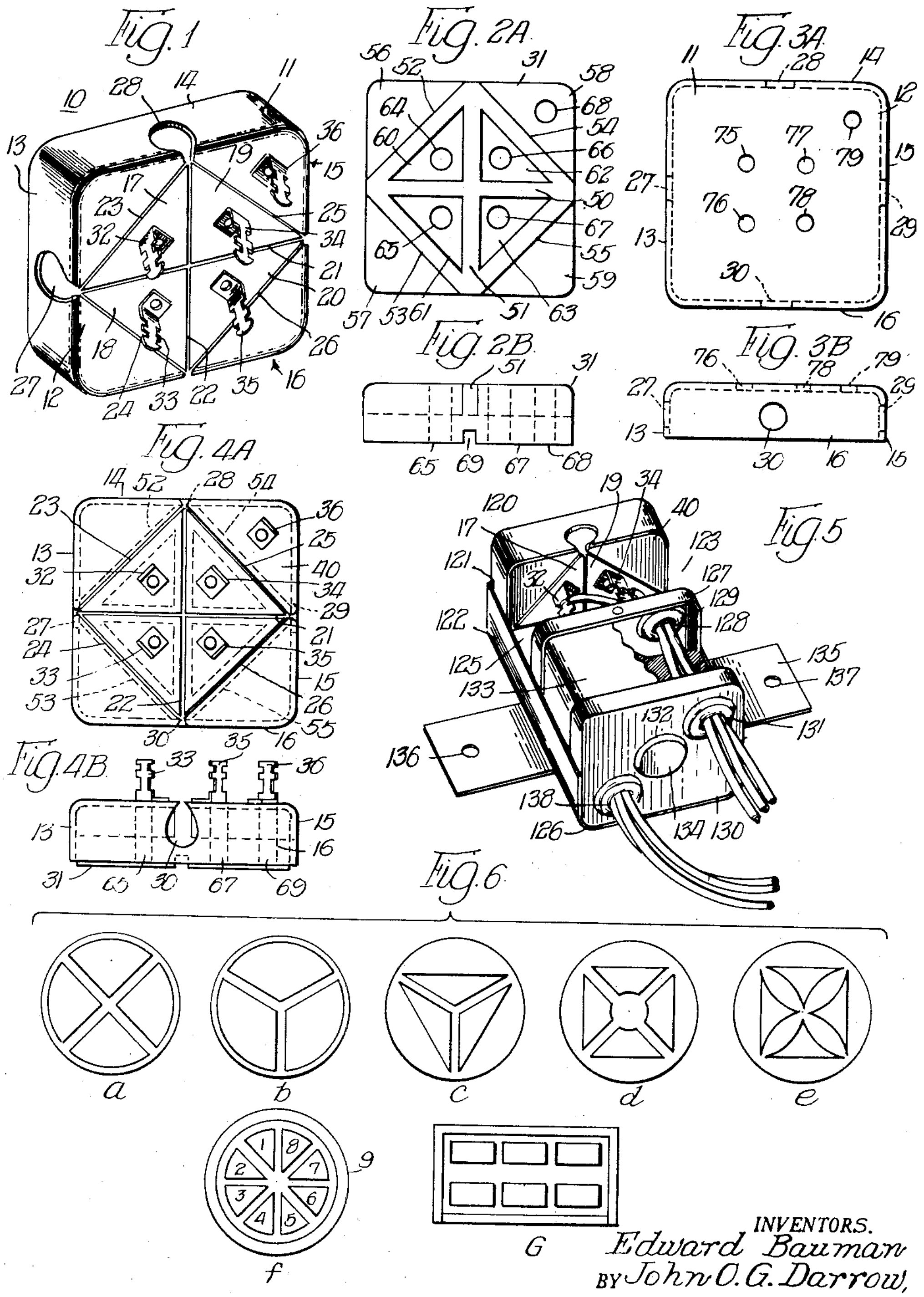
Figures 7, 8, 9, 10, 12, 13:
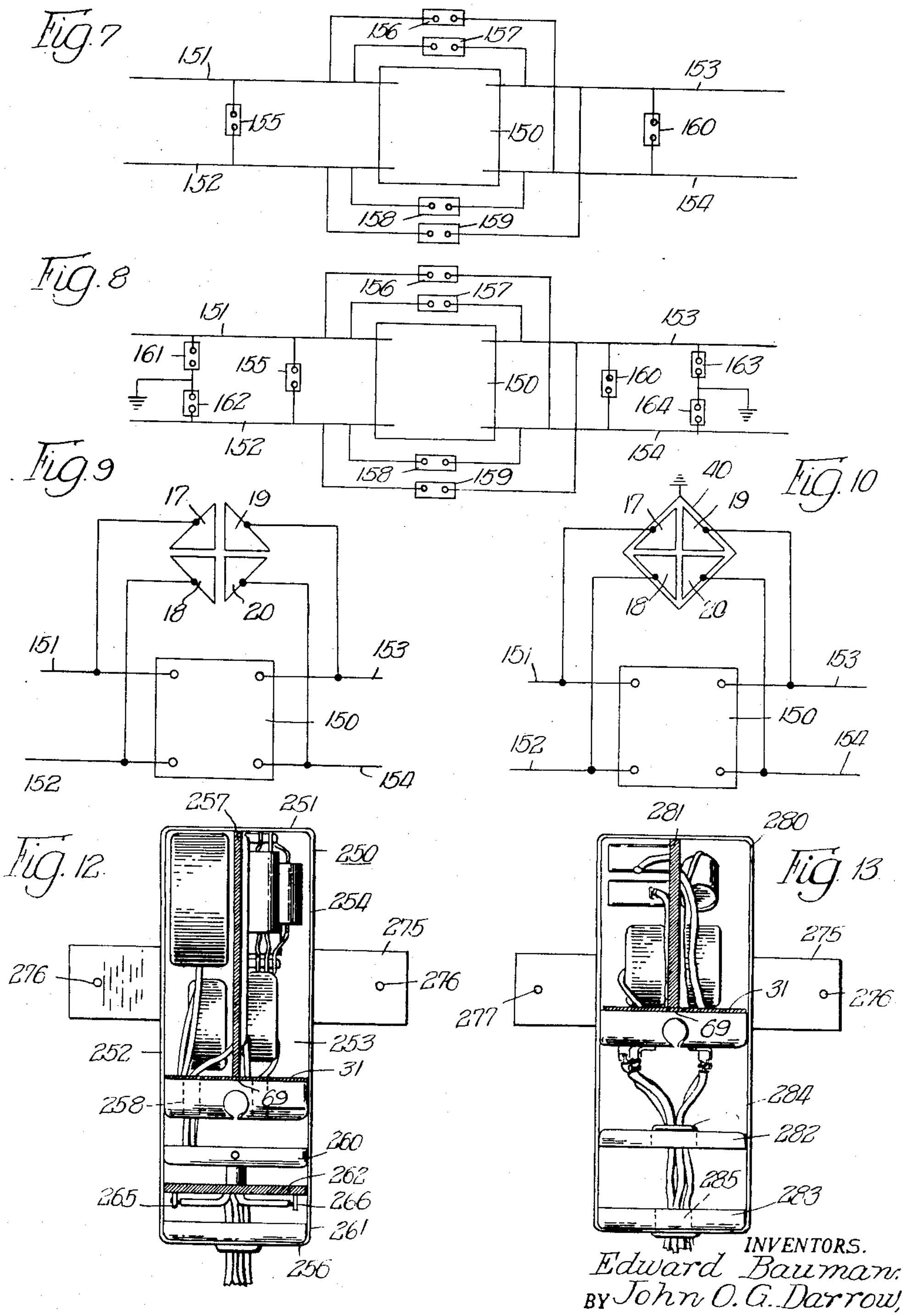
Figure 11:
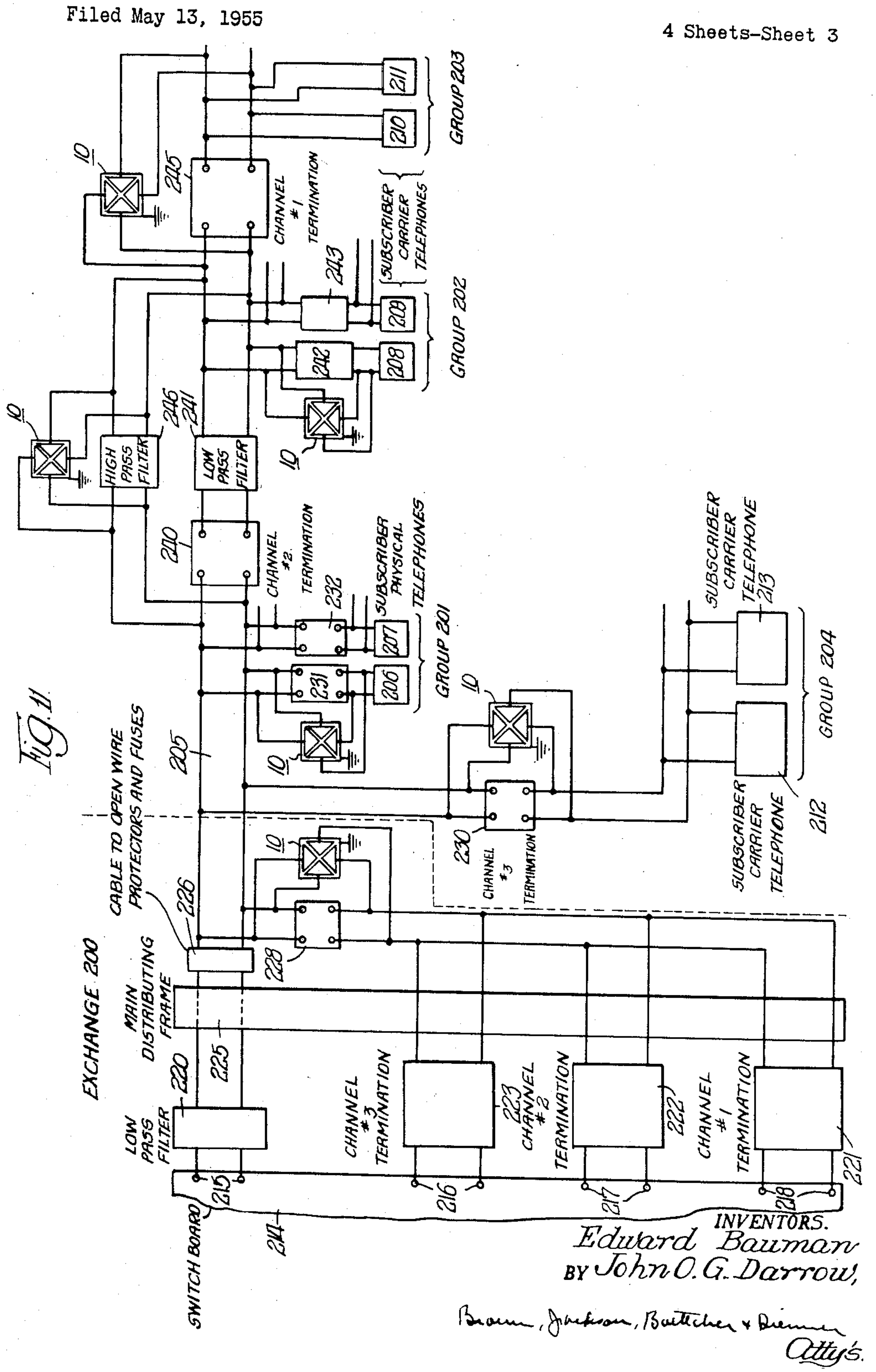
Figures 14, 15, 16, 17, 18, 19:
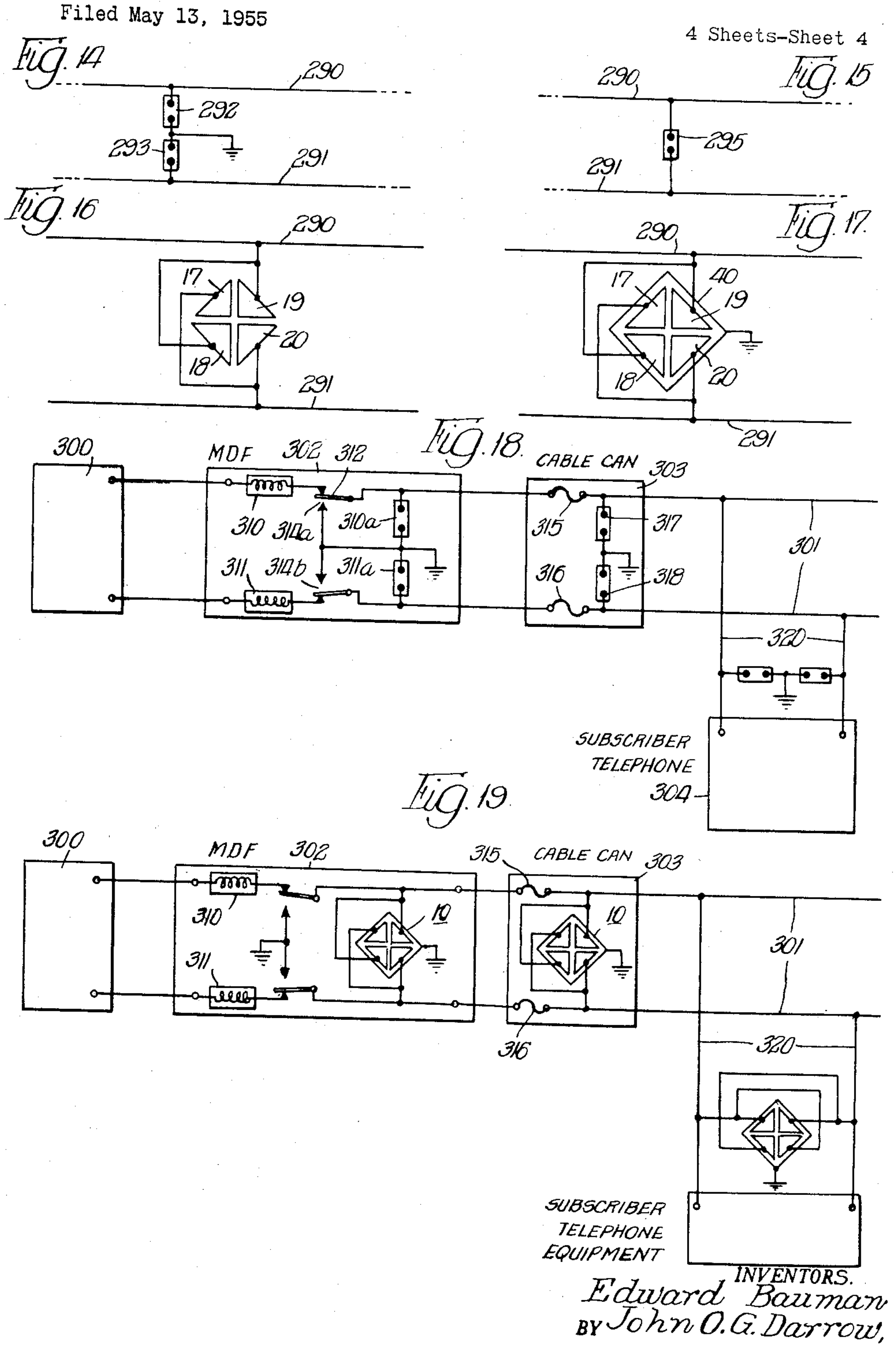

Figure 6 comprises plan views of various modifications of the protector device;

Figures 7 and 8 are schematic representations of a four wire terminal network in a two conductor transmission line which illustrate environments wherein the protector device of the present invention may be utilized;

Figure 9 is a schematic representation of an embodiment of the protector device as utilized in the environment of Figure 7;

Figure 10 is a schematic representation of one embodiment of the protector device useful in the environment of Figure 8;

Figure 11 is a schematic representation of a complete carrier telephone system wherein the protector device of the present invention may be effectively used;

Figures 12 and 13 are plan views partly in cross-section of the protector device of the present invention in unitary combinations with components of a carrier telephone system;

Figures 14 and 15 are schematic representations of different environments in which the protector device of the present invention may be utilized;

Figures 16 and 17 are schematic representations of embodiments of the protector device which may be used in the embodiments of Figures 14 and 15;

Figure 18 is a schematic representation of a telephone system subject to excessive voltages and currents; and Figure 19 is a schematic representation of the protector device of the present invention used in the environment of Figure 18.

The novel protector device of the present invention may be best described with reference to Figure 1 of the accompanying drawings which illustrates in perspective view a preferred embodiment of the basic protector device, as indicated generally by the numeral 10. Protector device 10 affords a number of gaps which act as discharge paths for excessive voltages appearing on transmission line conductors connected thereto by virtue of the coplanar arrangement of metallic plates separated from each other by preassigned distances. In the preferred embodiment protector device 10 comprises a square can 11 of brass, or other highly electrically conductive material, having a flat upper plate 12 and four short depending sides 13—16 disposed perpendicularly thereto. Plate 12 of protector device 10 is cut to form four coplanar triangular metallic plates 17—20 separated from each other by two intersecting slots 21 and 22 which extend along the diagonals of a square formed by plates 17—20. Plates 17—20 are separated from the remainder of can 11 by slots 23—26, each slot providing an air gap between its respective plate and the major portion of can 11.

The width of the gaps between the sides and vertices of the triangular segments 17—20 and between each of these segments and the remaining portion of the protector device is determinative of the difference of potential which is sufficient to arc across the gap, and hence, of the maximum permissible voltage between conductors connected to the plates.

The square formed by plates 17—20 is disposed so that its vertices lie at the midpoints of sides 13—16 of can lid 11. At the midpoints of sides 13—16 are drilled apertures 27—30, only two of which are shown, which are cut at points adjacent the vertices of the square to connect these apertures with their respective vertices.

Inserted in can 11 is a plug 31 (not shown) of insulating material such as wood, glass or a suitable resin compound, having trenches cut in the upper surface thereof in registration with slots 20—26 which separate the metallic segments or plates 17—20. Plug 31 is cemented to the under surfaces of can 11 and functions to support and maintain plates 17—20 in their non-contacting relationship with each other and the rest of can 11.

Suitable terminal lugs 32—36 are affixed respectively to each of metallic plates 17—20 and to one other section of plate 12 to provide means for connecting the protective device 10 into electrical circuit arrangements with transmission line conductors in combinations which will be discussed in greater detail hereinafter.

To supplement the more general description of the protective device 10 of the present invention, reference may be had to Figures 2A–4B which set forth in greater detail the component elements thereof, their basic structure prior to assembly, the method of their assembly, and the operation necessary to provide the complete structure. Figures 2A and 2B show in plan and elevation more detailed views of the insulating plug or block 31 prior to assembly. As may be seen from these figures, plug 31 is formed in the shape of a rectangular block having a bevelled upper edge and rounded corners. In the upper surface of the block a series of grooves or trenches 50—55 having perpendicular sidewalls and a depth of about one half the thickness of the block are cut to form a square with intersecting diagonals. The form of the square is such that its sides meet at the midpoints of the sides of block 31 and in effect divide the upper surface of the block into eight triangular sections 56—63 of which sections 56—59 are outside the square and sections 60—63 are inside thereof. Through the block are drilled four holes 64—67, one in each of the sections 60—63 and a fifth hole 68 is drilled in one of the outer sections 58. These holes are drilled to permit electrical conductors to penetrate the protective device for reasons which will become more apparent hereinafter. Another trench 69 similar to those discussed connecting midpoints of opposite sides of the block is cut in its lower surface and has a depth of about one-fourth of the thickness of the block.

Referring now to Figures 3A and 3B there is therein illustrated prior to its assembly in the unit, a hollow rectangular can 11, such as that illustrated in Figure 1, comprising an upper plate 12 and depending sides 13—16 perpendicular thereto. The length of each of the depending sides 13—16 is slightly less than the thickness of the rectangular block previously described. The dimensions of the interior surface of can 11 are such that it encompasses the sides and top surfaces of the insulating block with only sufficient clearance to permit a thin layer of cement or other binder for bonding these two structures together.

A series of five holes or apertures 75—79 are drilled in the upper plate 12 to be in registration with holes 64—68 of plug 31. A series of apertures 27—30 are respectively drilled at the midpoints of each of the depending sides 13—16 and have a diameter approximately one half of the width of the corresponding sides.

The assembled basic protector 10 which comprises the block of Figures 2A, 2B and the can cover of Figures 3A, 3B is illustrated in Figures 4A and 4B. Prior to final assembly, terminal conductors or lugs 32—36 of conventional L shaped configuration suitable for soldering electrical connectors thereto are crimped respectively in each of apertures 75—79 and extend upwardly at right angles to plate 12. Each of these terminal connectors 32—36 is arranged to have an aperture of small diameter centrally located in its base to permit an electrical conductor to penetrate through the assembly and permit its being soldered or fastened to its respective lug.

In assembling the protective device a thin layer of bonding cement or other conventional adhesive material is spread over the top and sides of insulating block 31 which is then inserted into can 11. After a period of time suitable for the cement to set, a square with its diagonals is cut into the upper plate 12 of can 11 so that the cuts are taken in registration with the trenches of block 31 lying underneath. By cutting the can 11 in this fashion a plurality of slots 21—26 are formed which divide the upper surface 12 of can 11 into five parts; namely, four segments 17—20, and the remainder of the can 11 which for convenience may be designated by the numeral 40. Four of these segments 17—20 are triangular in shape and are separated from each other and from the remainder of the can by the slots 21—26. Each of these segments is maintained in its spaced relationship with respect to the rest of the structure by virtue of the bonding cement which holds it in place on the upper surface of block 31. The fifth segment 40 comprises the remainder of can 11 and is separated from each of the four segments 17—20 by slots 23—26.

In the cutting process which forms slots 21—26 a certain amount of cuttings or filings unavoidably drops into the underlying trenches. Since these filings might form a direct path to ground or at any rate reduce the potential at which the protective device would fire, they must be removed. Removal of these filings is accomplished by using blasts of compressed air directed through the trenches of block 31. It will be recalled that four apertures 27—30 are provided at the midpoints of the sides 13—16 of can 11. The primary purpose of these holes is to facilitate removal of these filings by providing a means of egress therefor during the application of the compressed air.

Slots 21—26 form air gaps between adjacently disposed elements across which the excessive differences of potential appearing therebetween are discharged. The width of each of these slots or air gaps is smaller than the width of its respective underlying trench so that there will be a minimum of current flow over the surface of the insulating block and the electrical operation of the structure is such that the discharge of the excessive voltage occurs across the air gap.

The following chart shows exemplary dimensions for a practical embodiment of the protector device 10. These dimensions should not be construed as limitations, however, upon the protector device claimed hereinafter:

*Chart I*

| | Inches |
|---|---|
| Overall length of protector | 1 15/16 |
| Overall width of protector | 1 15/16 |
| Thickness of protector | 9/16 |
| Diameter of apertures in the sides | 1/4 |
| Width of trenches in plug **31** | 1/8 |
| Depth of trenches in plug **31** | 3/16 |
| Width of slots **21—26** in plate **12** | .012 |

While the basic protector device thus far described may be used in the manner hereafter discussed to minimize the hazards of high potentials on transmission lines, one convenient means of mounting such device has been developed as shown in Figure 5. Basically the mounting structure of Figure 5 comprises a rectangular can 120 which is fragmentarily illustrated to show the interior thereof.

The enclosing can 120 is rectangular in shape and has a closed end 121 integral with the four sides 122—125 thereof. The other end 126 of can 120 is left open so that the protector device may be inserted therein. Prior to the insertion of the protective device per se, as illustrated in Figure 1, insulated leads or electrical conductors are soldered to each of the lugs 32—36 extending from the segments of plate 12. Bonding cement is applied to the bottom and sides of the protector device 10 which is then inserted in the can and bonded against the closed end 121 thereof with the terminal lugs extending toward the open end 126. After the bonding cement has set, can 120 and its enclosed protective device are in effect a unitary structure. A second plate 127 having short depending sides is inserted into the can and cemented in place about half way down. Plate 127 has an aperture 128 therein to provide a means of egress for the conductors attached to the lugs 32—36 of the protective device. A rubber grommet 129 is inserted into aperture 128 to protect the leads from any chafing action which might strip the insulation off them.

A second metallic plate 130 similar to plate 127 and having a surface area approximately equal to that of the open end 126 of can 120 is then inserted at end 126 of can 120 to seal the open end. Such plate also has a grommetted aperture 131 to permit the egress of the electrical conductors connected to lugs 32—36. In assembling the structure the leads from the protector device 10 are threaded through the grommetted apertures of each of the plates 127 and 130 prior to their insertion in the can. Additionally, the upper plate 130 has a second aperture 132 which serves as a means for introducing an asphalt base or other suitable compound 133 which fills the space between plates 127 and 130 to insure hermetically sealing off the protective device so that moisture or dust cannot accumulate in the trenches and on the surfaces of the protective device to alter its discharge characteristics and lower the potential at which the air gaps operate. A cap 134 is provided to close aperture 132 after the introduction of the sealing compound. An elongated rectangular metal strip 135 is soldered to one side of the can and extends outwardly thereof. Apertures 136 and 137 are provided in strip 135 to provide means for mounting the complete unitary structure including the protector device.

Under certain circumstances it may be desirable to provide a second set of conductors each of which is also attached to one of the lugs of a protector device in parallel with the conductors of the first set. In this case the plates 127 and 130 disposed between the protector device 10 and the open end of the can are each provided with an additional grommeted aperture (only one of which 138 is shown) through which the leads of the second set may be extended. The purpose and function of the two groups of conductors will become apparent from the subsequent discussion.

Before proceeding with a discussion of the electrical characteristics of the protector device and the manner in which it functions in an electrical circuit, certain variations in the number and shape of the segments constituting the protector device may be considered. Figure 6 illustrates a few of the many variations which will occur to those skilled in the art in order to provide the simple yet effective protector device of the present invention. Figure 6 illustrates only a top view of plate 12 of the protector device, it being understood that the remainder of the device is constructed according to the teaching herein set forth, modified only to fit the particular variation being discussed. For example, if it is desired to use a container of circular cross section, a protector device having four interior segments as shown in Figure 6*a* may be utilized. If instead of four interior segments, it is desirable to use only three, then the variations illustrated in Figures 6*b* and 6*c* may be utilized. As an alternative variation Figure 6*d* shows a protector device in which discharge paths occur between the sides of adjacent segments and not across adjacent vertices thereof. On the other hand Figure 6*e* illustrates a protector device in which the discharge paths are across adjacent vertices of the segments rather than between their adjacent sides. If a number of segments greater than four is desired a protector device having a configuration such as shown in Figure 6*f* may be utilized. In this latter variation there are eight segments disposed around the center of the protector device and surrounded by an additional or ninth element. This latter variation provides 36 combinations of air gaps which may be utilized for protective purposes. The variation of Figure 6G illustrates six center segments encompassed by a seventh or outer segment. Without further expansion at this point, it is readily seen than an infinite variety of different configurations may be conceived, and it is intended in the appended claims to cover all possible combinations of air gaps in a device of this kind.

The manner in which the novel protector device of the present invention is electrically connected to provide protection against excessive voltages and currents on transmission lines is now set forth. With reference to Figure 7, there is illustrated thereat a four wire terminal 150 to which a first transmission line comprising a pair of input conductors 151 and 152 and a second transmission line comprising a pair of output conductors 153 and 154 are connected. Separate excess voltage dissipating devices 155—160 are connected to provide discharge paths for voltages and currents exceeding a predetermined value existing between each of conductors 151—154 in all combinations. Such devices may be of the carbon block type prevalent in telephone systems or other types of spark gaps such as those used in power distribution systems depending upon the desired environment.

The discharge paths for excessive voltages between each of the conductors and every other conductor may be more clearly understood with reference to the following chart:

*Chart II*

| Conductors: | Protective device providing the discharge path |
|---|---|
| **151** and **152** | **155** |
| **151** and **153** | **157** |
| **151** and **154** | **156** |
| **152** and **153** | **159** |
| **152** and **154** | **158** |
| **153** and **154** | **160** |

Figure 8 illustrates the same four wire terminal 150 of Figure 7 and its input and output conductors 151—154, connected as therein shown but differs from the previous figure in that excessive voltage dissipating devices 161—164 are respectively provided between each conductor and ground to provide discharge paths for excessive voltages existing therebetween.

Reference may be had to Figure 9 to show the use of the protector device of the present invention as shown in Figure 1 for providing adequate protection against excessive voltages arising between the terminals of the four wire terminal network 150 as illustrated in Figure 7. In this case triangular segments 17—20 are connected respectively to conductors 151—154. Spark gaps are provided between the adjacent sides of these segments to provide discharge paths for the elimination of excessive voltages between the conductors. The following chart indicates the air gaps provided by the protective device:

*Chart III*

| Conductors | Discharge Paths |
|---|---|
| 151—152 | across adjacent sides of segments 17 and 18. |
| 151—153 | across adjacent sides of segments 17 and 19. |
| 151—154 | across adjacent vertices of segments 17 and 20. |
| 152—153 | across adjacent vertices of segments 18 and 19. |
| 152—154 | across adjacent sides of segments 18 and 20. |
| 153—154 | across adjacent sides of segments 19 and 20. |

Thus, it is seen that a single compact unitary protector device of the present invention comprising an insulating block and a plurality of metallic segments held in fixed spacial relationship by such block may replace the more cumbersome and expensive carbon block structure hitherto employed. The protection afforded by the protector device is equal to that provided by the more costly and awkward structures previously utilized.

If it is desired to provide excess voltage discharge paths between each of the four conductors used in a four terminal network arrangement and every other conductor, and between each conductor and ground to provide a maximum of protection against such excess voltages as in the case illustrated by Figure 8, the protector device 10 may be connected as illustrated in Figure 10. In this case triangular plates 17—20 are connected to conductors 151—154 respectively and the remainder 40 of the can 11 is connected to ground. In this figure discharge paths are provided for the dissipation of excessive voltages as follows:

*Chart IV*

| Conductors | Discharge Paths |
|---|---|
| 151—152 | across adjacent sides of plates 17 and 18. |
| 151—153 | across adjacent sides of plates 17 and 19. |
| 151—154 | across adjacent vertices of plates 17 and 20. |
| 152—153 | across adjacent vertices of plates 18 and 19. |
| 152—154 | across adjacent sides of plates 18 and 20. |
| 153—154 | across adjacent sides of plates 19 and 20. |
| 151—ground | across adjacent sides of plates 17 and 40. |
| 152—ground | across adjacent sides of plates 18 and 40. |
| 153—ground | across adjacent sides of plates 19 and 40. |
| 154—ground | across adjacent sides of plates 20 and 40. |

From the preceding chart it is seen that a maximum amount of protection against excess voltages is afforded by a protector device which occupies a minimum amount of space and which is easily adapted to provide such protection under varying circumstances. In this manner a single unitary device of compact structure may be substituted for the more expensive and cumbrous prior art devices without impairment of protection.

The flexibility of the novel protector device may be more fully appreciated by a discussion of its application to a complete telephone carrier subscriber system. In certain of the applications the protector device is used in the embodiment previously discussed wherein the device per se was hermetically sealed in an enclosing can to protect it from dust and moisture. In addition the protector device may be combined in a single hermetically sealed unit with other electrical components of telephone systems, such as, matching transformers and bridging filters. The physical embodiments of these latter structures will be discussed more fully hereinafter, but it is believed expedient to first discuss the circuit aspects of the novel protector device in the environment of a telephone carrier subscriber system. In this regard reference is made to Figure 11 wherein is shown a complete telephone carrier subscriber system of conventional design comprising an exchange 200 which serves four groups of subscribers 201—204, each group being connected to an open wire line 205.

The groups 201—204 may comprise a number of subscribers in a party line arrangement each having a conventional substation telephone set and by selective divided ringing as many as ten subscribers for each group may be conveniently served. For convenience, only two subscribers arranged on a two party line system is shown for each group.

In this regard the subscribers 206 and 207 of group 201 are reached directly over the physical circuit without the use of a modulated carrier wave. The subscribers 208 and 209 of group 202, subscribers 210 and 211 of group 203, and subscribers 212 and 213 of group 204 are served over separate channels each having a different carrier frequency wave modulated with the voice frequency currents to be carried. Suitable terminating equipment is used to separate these channels and prevent cross talk or cross modulation.

Referring now to the equipment at the exchange 200, there is therein provided a switchboard 214 which terminates each of the four channels at separate jack positions 215—218. A low pass filter 220 connected between jack position 215 and the outgoing line, is used to insure separation of the voice frequencies which serve the subscribers of group 201 who are reached over the physical circuit. Carrier terminal equipment 221—223 of conventional design supplies a separate carrier wave for modulation and demodulation of signals for each channel over which the conversations and ringing currents for the subscribers of groups 202—204 may be individually transmitted. A main distributing frame 225 having suitable heat coils and lighting arrester equipment (not shown) is used to terminate the incoming line in the conventional manner. A separate central office cable to open wire lightning protector and fuse arrangement 226 is provided to serve as a first line of protection for the central office equipment against foreign voltages appearing on the open wire line. An impedance matching transformer 228 for channels 1—3 protected by the novel protector device 10 of the present invention is connected between the outgoing line 205 and the main distributing frame 225.

Subscribers 212 and 213 of group 204 which in this illustration are served by signals over channel #3 are accessed over open wire line 205 through a pole mounted channel termination 230 suitable for demodulating the signals of channel #3 into voice frequency signals and for modulating a carrier for the transmission of voice frequencies from the subscriber to the switchboard over line 205. The terminating circuit 230 may be considered to be in the nature of a four wire terminal circuit on a two wire transmission line and thus adequate protection against excessive foreign voltages and currents may be afforded by the protector device 10 of the present invention connected as shown in Figure 10.

Subscribers 206 and 207 of group 201 are accessed over the open wire line 205 through low pass bridging filter networks 231 and 232 across each of which a protector device of the present invention is provided in the manner described with respect to Figure 10. A novel unitary structure which comprises the protector device of the present invention and the low pass bridging filter such as that herein used will be described hereinafter.

Subscribers 208 and 209 of group 202 are accessed over open wire line 205 through a pole mounted channel #2 termination 240, a common low pass filter 241, and individual low pass bridging filters 242 and 243. Each of the low pass bridging filters 242 and 243 is connected to the protector device of the present invention in the manner illustrated in Figure 10. Subscribers 210 and 211 of group 203 which are served over channel 1 and are accessed to jack position 218 of switchboard 214 through a channel #1 terminating equipment 245 and through a high pass filter 246 which is bridged across the channel terminating equipment for channel #2 and its associated low pass filter 241. As may be seen from this figure, both the channel #1 terminating equipment 245 and the high pass filter 246 are individually protected against excessive foreign voltages by the protector device of the present invention connected as illustrated in Figure 10. It may be appreciated that the protector device associated with the high pass filter 246 also is connected to the input of the channel #2 terminating equipment 240 and the output of the low pass filter 241 thus affording protection against excessive foreign voltages for this latter equipment.

Thus, the flexibility of the protector device 10 of the present invention is apparent from its use in protecting the various components of a telephone carrier system from excessive voltages.

It will be recalled that the four terminals of the impedance matching transformer 228 are connected to the novel protector device 10 of the present invention. With reference to Figure 12 the manner of physically connecting the impedance matching transformer and the protector device 10 in a hermetically sealed receptacle or can is clearly shown. In this figure a can 250 has a closed end 251 integrally connected to four depending sides 252—255 and an open end 256. The coils and condensers of a conventional impedance matching transformer are mounted on either side of an insulating bar 257 and are electrically connected to terminals mounted thereon. It will be recalled from the earlier discussion of the protective device per se, that the underside of plug 31 has a slot 69 cut therein. Slot 69 serves to mount insulating plate 257 which is set therein perpendicular to the base of plug 31 and bonded thereto by cement or other adhesive material. In this embodiment the protector device has an additional aperture 258 cut in plate 12 and plug 31 thereof to permit extension of leads or electrical conductors from the matching device therethrough.

In a manner similar to that described with reference to the packaging of the basic protector itself, two plates 260 and 261 are mounted in spaced relationship near the open end of can 250 and form a chamber into which a sealing compound of suitable composition (not shown) may be introduced to hermetically seal the enclosed impedance matching transformer and the basic protector per se. An insulating panel 262 is disposed intermediate the two parallel plates 260 and 261. Six lugs, only two of which 265 and 266 are shown, are provided on insulating panel 262 to provide means to which the aforementioned leads from the impedance matching transformer may be connected. Suitable cross-connections in the conventional manner may be made to alter the operating characteristics of the impedance matching transformer to meet different circuit requirements. As in the previous case, a bar 275 having apertures 276 and 277 is affixed to one outer side of the can to provide a convenient means of mounting the entire assembly on a suitable supporting structure (not shown).

Figure 13 illustrates the manner in which the basic protector 10 and a low pass bridging filter, for example, filter 241 of Figure 11, may be assembled in a can 280 to provide a unitary structure which may be conveniently mounted on a pole or other supporting structure. Can 280 is similar to can 250 previously described and has five sides comprising a rectangular enclosure. Prior to the insertion of the basic protector device 10 and bridging filter 241 into can 280, these components are assembled together in a manner similar to that described with reference to the impedance matching transformer 228 and the basic protector device. Specifically, an insulating member 281 extends perpendicularly from the base 31 of the basic protector 10 and is mounted in slot 69 cut therein in the previously described manner. The components comprising the low pass bridging filter 241 are disposed on either side of the insulating member 281 and form a compact structure therewith. The insulated electrical conductors connecting the terminals of the low pass bridging filter and the metallic segments 17—20 of the protector device pass through apertures 75—78 in block 31 and apertures 64—67 of the segments and are connected respectively to terminal lugs 32—35. The assembled basic protector 10 and low pass bridging filter 241 are inserted in the enclosing can 280 and cemented thereto. The open end of the can is sealed off in a manner similar to that described with reference to the packaging of the basic protector itself and is accomplished by the insertion of two parallel spaced apart plates 282 and 283 which form a chamber into which a sealing compound may be inserted to hermetically seal the unit. Prior to the assembly the leads from the various segments of the basic protector are threaded through grommeted apertures 284 and 285 in each of the two plates 282 and 283.

While thus far the application of the basic protector device has been discussed with reference to four wire terminal networks in a two conductor transmission system, such protector is equally applicable to simpler situations such as the protection of a two wire transmission line alone against excessive voltages and currents. As illustrated in Figure 14, there is therein shown a transmission line having conductors 290 and 291. In order to protect the transmission line from excess voltages and currents appearing thereon, each of the conductors is connected to ground over lightning arresters 292 and 293 respectively. Additionally protection may be afforded against excess voltages and currents occuring between the conductors 290 and 291 themselves by the arrangement shown in Figure 15 in which a lightning protection device 295 is connected between conductors 290 and 291. In order to illustrate one of the many variations of protector device 10 of the present invention which may be used in this environment, reference may be had to Figure 16 in which elements 17—20 are utilized to guard against excessively high voltages and currents between conductors 290 and 291. In this application, a maximum amount of protection is afforded since the number of air gaps available for the discharge of voltages between conductors 290 and 291 is afforded by the illustrated manner of connecting the segments 17—20 of protector device 10 in circuit relationship with conductors 290 and 291. In the embodiment therein illustrated segments 18 and 19 are electrically connected in parallel to conductor 290 while segments 17 and 20 are connected in parallel to conductor 291. In this way a maximum number of air gaps as shown in the following table is provided to permit discharge of excessive voltages appearing between conductors 290 and 291.

*Chart V*

| Air Gap | Discharge Paths |
|---|---|
| 1 | Between adjacent sides of plates 17 and 19. |
| 2 | Between adjacent sides of plates 17 and 18. |
| 3 | Between adjacent sides of plates 18 and 20. |
| 4 | Between adjacent sides of plates 19 and 20. |

Thus it may be seen that in this embodiment there are four paths for effecting the discharge of excessive voltages between conductors 290 and 291. The use of four plates, of course, is not necessary, and in its simplest embodiment protection against excessive voltages between conductors may be achieved by the utilization of any two adjacent plates and connecting them respectively to the conductors 290 and 291.

In order to provide additional protection not only for excessive voltages appearing between conductors 290 and 291, but also against high voltages appearing between each of these conductors and ground, the electrical connections shown in Figure 17 may be utilized. In this case the interior segments 17—20 are connected in a manner identical to that illustrated in Figure 16 while the remainder of the protector device 10 is connected to ground. In addition to the discharge paths for excessive voltages between the conductors 290 and 291 there are also provided additional paths for the discharge of excessive voltages between these conductors and ground. A repetition is deemed unnecessary of the discharge paths for excessive voltages between the transmission lines, however, the following chart illustrates the discharge paths between each transmission line and ground.

*Chart VI*

| Conductor | Discharge Path |
|---|---|
| Conductor 290 | The hypotenuse of plate 18 and segment 40. |
| Conductor 290 | The hypotenuse of plate 19 and segment 40. |
| Conductor 291 | The hypotenuse of plate 17 and segment 40. |
| Conductor 291 | The hypotenuse of plate 20 and segment 40. |

In addition to the protection against foregin voltages in transmission line conductors, it is also necessary to provide for protection of the central office equipment and subscriber substation equipment from such voltages. To more fully illustrate the protection of such equipment from excessive voltages and currents reference may be had to Figure 18 which illustrates such equipment and the conventional protection means employed therewith. As illustrated in Figure 18 a central office switchboard 300 is connected to a two wire transmission line 31 through the series combination of a main distributing frame 302 and a pole mounted cable can 303. A subscriber subset 304 which may be one of any number is connected to the conductors of the transmission line 301.

The main distributing frame 302 at the central office usually comprises a pair of heat coils 310 and 311 inserted respectively in series with each of the conductors leading thereto and a pair of lightning arresters or carbon block protectors of conventional design 310*a* and 311*a* each connecting a separate conductor to ground. Heat coils 310 and 311 are utilized to protect the central office equipment, such as switchboard 300, from excessive longer lasting currents which may not be sufficient to break down the air gap in the lightning protectors.

Each of the heat coils 310 and 311 is conventional in structure and operation and comprises a resistance wire of a few ohms which becomes heated by the passage therethrough of currents in excess of a predetermined amount. Because of the heat generated, a ratchet wheel (not shown) is allowed to turn upon the melting of solder or other similar substance having a low melting point. The release of the ratchet wheel frees a spring which causes a lever, such as 312, to interrupt the circuit between the switchboard and one of the conductors of line 301 and to complete a circuit from that conductor to ground over contact 314*a*. In like manner heat coil 311 operates to extend a circuit over contact 314*b* to prevent any excessive current flowing in the other conductor of line 301 from damaging switchboard 300.

In the normal telephone plant, a pole mounted cable can such as can 303, containing fuses 315 and 316 and carbon block protectors 317 and 318 is interposed between the local cable leading from the central office and the open wire line 301. This circuitry provides a first line of defense against excessive voltages and currents flowing in the open wire line and protects the central office equipment.

At the subscribers premises a conventional carbon block protector arrangement is connected between each side of the drop wire 320 and ground.

To illustrate the manner in which the novel protector device of the present invention may be used in conjunction with the telephone system illustrated in Figure 18, reference is made to Figure 19 wherein is illustrated the preferred circuit connections for providing protection against excessive voltages and currents flowing in the system. For a more complete analysis of the function of the protector device under these circumstances reference may be had to Figure 17 and the accompanying descriptive material appearing hereinbefore wherein such analysis was made. Briefly, however, each of the conductors of the open wire line 301, the entrance cable between the main distributing frame 302 and the cable can 303, and the subscriber's drop 320 are protected from excessive voltages between each of the conductors and between each conductor and ground. Additionally, the heat coils 310 and 311 and the fuses 315 and 316 all of which are conventional are connected in series in the loop between the switchboard 300 and substation equipment 304 to provide protection against excessive currents which are of longer duration than momentary lightning currents but which are not of sufficient amount to arc across the gaps of the protector device.

In summary, the present invention is directed toward a novel protector device which is extremely versatile and flexible in application, simple and economical to manufacture, reliable in operation and occupies a minimum amount of space. It is adaptable to protect substation and central office equipment from excessive voltages and currents which would otherwise damage such equipment and endanger the persons of those rendering and using telephone service. Such device is also useful in power transmission systems and antennas to guard against excessive voltage and currents.

The protector device is not only compact but is adapted for mounting in a small hermetically sealed unit for indefinite life without deterioration in characteristics because of high humidity or extraneous dust or other particles.

While what has been described are regarded to be preferred embodiments of the present invention, other modifications and variations may be made therein without departing from the scope of the present invention as defined by the appended claims.

We claim:

1. An excess voltage dissipator device including a metallic cap member divided into a plurality of central segments by gaps of a predetermined width, each of said segments being spaced at all of its peripheral points from the peripheral points of the other segments and the peripheral points of the adjacent portion of said cap member by said fixed gap width, means for supporting said segments in said given spaced relation, and terminal means on each of said segments and said cap member for connecting the different segments and said cap member to elements which are subject to different values of potential.

2. An excess voltage dissipator device comprising a metallic can having separate plates provided on a wall thereof by gaps of predetermined width, insulating means inserted interiorly of said can and having segmented areas separated by trenches of greater width than said gaps, said trenches corresponding to and being in registration with said gaps, means for affixing said plates to said segmented areas and certain surfaces of said insulating means to interior surfaces of said can to form a unitary structure therewith, and terminal means on each of said plates for connecting the different plates to elements which are subject to different values of potential.

3. An excess voltage dissipator device comprising a metallic plate divided into a plurality of substantially triangular plate segments by gaps of a predetermined width, the vertex of each triangular member being located adjacent a common central point with the adjacent edges of the triangles spaced by said gaps, and terminal means on each of said plates for connecting the different plates to elements which are subject to different values of potential.

4. An excess voltage dissipator device comprising a metallic cap having at least one wall segmented into a plurality of plates, each plate having a pair of edges which terminate at a point, terminal means on each plate for connecting the different plates to elements which are subject to different values of potential, and means for fixedly supporting said plates with each edge of said pair of edges of a plate in adjacent relation with an edge of another plate to provide a spark over gap therewith and with said points grouped about a common point to provide a sparkover gap between the points of at least certain of said plates.

5. A protector device for dissipating excessive voltages between a pair of conductors and between each of said pair of conductors and ground, comprising a plurality of metallic segments, means for supporting said segments in fixed spaced relationship, the adjacent edges of adjacent metallic segments being separated by a gap of predetermined width, an enclosing structure separated from each of said metallic segments by a gap of predetermined width, means for effecting connection of each of said metallic segments to an assigned one of said conductors, and means for effecting connection of said enclosing structure to a point of ground potential.

6. A protector device for dissipating excessive voltages between terminals of a four terminal network comprising at least four metallic segments, means for supporting said segments in fixed spaced relationship, the edges of adjacent ones of said metallic segments being separated by a gap of predetermine width, an enclosing structure separated from each of said metallic segments by a gap of predetermined width, means for effecting connection of each of said metallic segments to a corresponding one of said terminals, and means for effecting connection of said enclosing structure to a point of ground potential.

7. A protector device for dissipating excessive voltages in an associated equipment comprising a plurality of metallic segments in fixed spaced relationship, each of said segments having at least three boundary edges, adjacent ones of said metallic segments being separated by a gap extending along adjacent sides thereof, an enclosing structure having a plate surrounding said plurality of metallic segments and separated from each segment by a gap of predetermined width extending along at least one edge of each of said segments, said enclosing structure having sides integral with and perpendicular to said plate forming a container, an insulating block affixed interiorly of said container having a plurality of raised sections defined by trenches located in registration with said gaps, said metallic segments being affixed thereto for maintaining same in said fixed spaced relationship, and terminal means on each of said segments and said plate for connecting the same to elements which are subject to different values of potential.

8. An excess voltage dissipator device comprising a metallic cap having at least one wall divided into a plurality of pointed segments by gaps of a predetermined width, the outer edge of said segments forming a square and the interior edges of said segments forming diagonals of said square, adjacent edges of said segments forming sparkover gaps and adjacent points of said segments forming additional spark over gaps, means for supporting said segments in fixed relationship, a peripheral segment disposed in encompassing relation with said outer segment edges, and terminal means on said pointed and said peripheral segments for connecting the different segments to elements which are subject to different values of potential.

9. An excess voltage dissipator device comprising a plurality of current conductive members each of which includes a plurality of elongated marginal edges, and means for supporting said members with at least two of the marginal edges of each member in adjacent substantially equidistant spaced relation with a similar edge of more than one of the other members to thereby provide a plurality of different protective paths and terminal means on each of said members for connecting the different members to elements which are subject to different values of potential.

10. An excess voltage dissipator device comprising a metallic plate divided into a plurality of segments by gaps of a predetermined width, including a plurality of central segments, a peripheral segment disposed to encompass at least partially the outer periphery of the plurality of central segments, one of the outer edges of each central segment being disposed in spaced and subtended relation with a preassigned portion of the outer peripheral segment, and at least two other edges of each central segment being disposed in spaced relation with corresponding edges of adjacent segments to thereby provide a plurality of voltage dissipating gaps with the peripheral segment and with each other, and terminal means on each of said segments for connecting the different segments to elements which are subject to potentials of different values.

11. A method of making an excess voltage dissipator device which comprises the steps of forming a pattern of grooves on a substantially planar surface of an insulating member to thus provide separate areas in relief on said surface, fixedly mounting a metallic plate on said surface, and sectioning said plate into a plurality of segments separated by gaps of a predetermined distance, said gaps being in registration with said grooves and affixing terminal means to each of said segments.

References Cited in the file of this patent

UNITED STATES PATENTS

| | | |
|---|---|---|
| 720,226 | Coleman | Feb. 10, 1903 |
| 772,190 | Thomas | Oct. 11, 1904 |
| 840,036 | Baldwin | Jan. 1, 1907 |
| 968,938 | Hale | Aug. 30, 1910 |
| 1,124,865 | Cox | Jan. 12, 1915 |
| 1,270,362 | Baruch | June 25, 1918 |
| 1,636,544 | Atherton | July 19, 1927 |
| 2,666,908 | Klostermann | Jan. 19, 1954 |